(12) United States Patent
Uohashi

(10) Patent No.: US 9,938,098 B2
(45) Date of Patent: Apr. 10, 2018

(54) ROLLER DRIVE TRANSMISSION DEVICE AND AUTOMATIC DOCUMENT FEEDER AND IMAGE FORMING APPARATUS PROVIDED WITH SAME

(71) Applicant: KYOCERA Document Solutions Inc., Osaka-shi, Osaka (JP)

(72) Inventor: Yuki Uohashi, Osaka (JP)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 15/437,775

(22) Filed: Feb. 21, 2017

(65) Prior Publication Data

US 2017/0247212 A1  Aug. 31, 2017

(30) Foreign Application Priority Data

Feb. 25, 2016  (JP) .................................. 2016-034197

(51) Int. Cl.
| | |
|---|---|
| *B65H 3/06* | (2006.01) |
| *B65H 5/06* | (2006.01) |
| *F16D 11/14* | (2006.01) |
| *F16D 41/22* | (2006.01) |
| *F16D 11/00* | (2006.01) |

(52) U.S. Cl.
CPC .......... *B65H 5/066* (2013.01); *B65H 3/0669* (2013.01); *B65H 3/0684* (2013.01); *F16D 11/14* (2013.01); *F16D 41/22* (2013.01); *B65H 2403/47* (2013.01); *B65H 2403/721* (2013.01); *B65H 2801/06* (2013.01); *B65H 2801/39* (2013.01); *F16D 2011/002* (2013.01); *F16D 2011/008* (2013.01)

(58) Field of Classification Search
CPC .... B65H 3/0669; B65H 3/0684; B65H 5/066; B65H 2403/44; B65H 2403/47; B65H 2403/48; B65H 2403/731; B65H 2403/721; F16D 41/22; F16D 11/14; F16D 2011/008; F16D 2011/002
See application file for complete search history.

(56) References Cited

U.S. PATENT DOCUMENTS

| | | | | |
|---|---|---|---|---|
| 2012/0070211 A1* | 3/2012 | Koiwai | ................ | B65H 3/0684 399/361 |
| 2014/0078528 A1* | 3/2014 | Muraoka | .............. | B65H 3/0669 358/1.12 |
| 2015/0008638 A1* | 1/2015 | Yamamoto | ............... | B65H 5/06 271/256 |

FOREIGN PATENT DOCUMENTS

JP      7-53069      2/1995

* cited by examiner

*Primary Examiner* — David H Bollinger
(74) *Attorney, Agent, or Firm* — Gerald E. Hespos; Michael J. Porco; Matthew T. Hespos

(57) ABSTRACT

A roller drive transmission device includes a drive input gear, a drive transmission gear, a roller unit and a ratchet mechanism. When a rotational drive force is input to the drive input gear and the drive transmission gear is slid to a first position, the drive input gear, the drive transmission gear and the roller unit are integrally rotated in a first rotational direction. When the input of the rotational drive force to the drive input gear is cut off and the roller unit is rotated, following a sheet, the drive transmission gear is slid to a second position and the roller unit and the drive transmission gear are decoupled. The ratchet mechanism includes a load adjustment mechanism configured to make a rotational load in the first rotational direction of the drive transmission gear arranged at the second position larger than a movement load in an axial direction.

8 Claims, 20 Drawing Sheets

ROLLER DRIVE TRANSMISSION DEVICE
AND AUTOMATIC DOCUMENT FEEDER
AND IMAGE FORMING APPARATUS
PROVIDED WITH SAME

This application is based on Japanese Patent Application No. 2016-034197 filed with the Japan Patent Office on Feb. 25, 2016, the contents of which are hereby incorporated by reference.

BACKGROUND

The present disclosure relates to a roller drive transmission device for transmitting a drive force to a roller and an automatic document feeder and an image forming apparatus provided with the same.

Conventionally, a sheet feeder is known as an apparatus provided with a roller drive transmission device. This sheet feeder includes a pickup roller for feeding a sheet, a sheet feed roller for conveying the sheet on a side downstream of the pickup roller and a separation pad for separating sheets one by one by being held in contact with the sheet feed roller.

The sheet feed roller is rotationally driven by a drive force transmission device. The drive force transmission device is provided with a power input unit including a projection, a power transmission unit including an engaging groove and a locking claw, and a power output unit including a ratchet groove and configured to integrally rotate with the sheet feed roller. According to an axial movement of the power transmission unit, the transmission of a drive force from the power input unit to the power output unit is switched.

SUMMARY

A roller drive transmission device according to one aspect of the present disclosure includes a drive input gear, a drive transmission gear, a roller unit and a ratchet mechanism. The drive input gear includes a gear portion to be rotated in a first rotational direction about a predetermined axis by having a rotational drive force input thereto and an engaging portion formed on a side surface of the gear portion. The drive transmission gear is arranged adjacent to the drive input gear on the axis and slidable along an axial direction of the axis. The drive transmission gear includes an engaged portion formed on one side surface in the axial direction and to be engaged with the engaging portion and a first gear portion having first gear teeth formed on the other side surface opposite to the engaged portion. The roller unit is arranged adjacent to the drive transmission gear on the axis and conveys a sheet by being rotated about the axis. The roller unit includes a second gear portion having second gear teeth formed on a side surface facing the drive transmission gear and engageable with the first gear teeth. The ratchet mechanism couples or decouples the drive input gear and the roller unit with rotation about the axis. The ratchet mechanism is configured such that in case the rotational drive force is input to the drive input gear, the drive input gear, the drive transmission gear and the roller unit are integrally rotated in the first rotational direction by the engagement of the first and second gear teeth the drive input gear rotates in the first rotational direction and the drive transmission gear is slid to a first position close to the roller unit, and that the first and second gear teeth are disengaged, whereby the drive transmission gear is slid to a second position closer to the drive input gear than the first position to decouple the roller unit and the drive transmission gear, in case the input of the rotational drive force to the drive input gear is cut off, the roller unit rotates, following the sheet and the second gear teeth are rotated in the first rotational direction with respect to the first gear teeth. The ratchet mechanism includes a load adjustment mechanism configured to make a rotational load in the first rotational direction of the drive transmission gear arranged at the second position larger than a movement load in the axial direction.

Further, an automatic document feeder according to another aspect of the present disclosure includes the above roller drive transmission device, and a sheet feeding unit including the roller member, which feeds the sheet. The sheet is a document having a document image formed on a surface. The sheet feeding unit conveys the document toward an image reading position where the document image is read.

Further, an image forming apparatus according to another aspect of the present disclosure includes the above automatic document feeder and an image forming unit configured to form an image on a sheet based on the document image.

DETAILED DESCRIPTION

Figure 1:
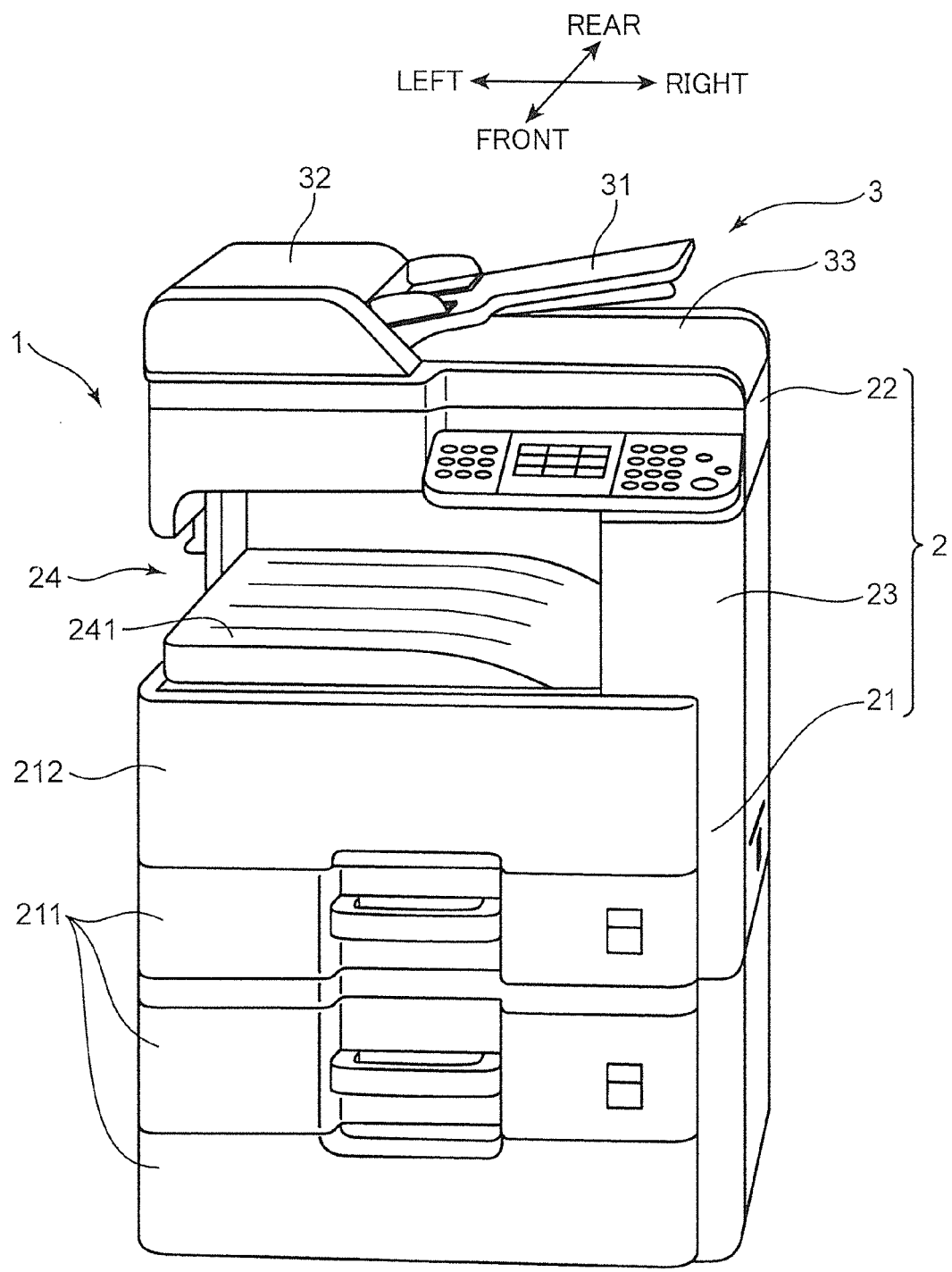
FIG. 1 is an appearance view of an image forming apparatus according to one embodiment of the present disclosure.

Hereinafter, an embodiment of the present disclosure is described with reference to the drawings. FIG. 1 is an appearance view of an image forming apparatus 1 according to one embodiment of the present disclosure. Although a copier of an in-body sheet discharge type is illustrated as the image forming apparatus 1, the image forming apparatus may be a printer, a facsimile machine or a complex machine provided with these functions.

The image forming apparatus 1 includes an apparatus body 2 having a substantially rectangular parallelepipedic housing structure and provided with an in-body space, and an automatic document feeder 3 arranged on the upper surface of the apparatus body 2.

The apparatus body 2 performs an image forming process on a sheet. The apparatus body 2 includes a substantially rectangular parallelepipedic lower housing 21, a substantially rectangular parallelepipedic upper housing 22 arranged above the lower housing 21, and a coupling housing 23 coupling the lower housing 21 and the upper housing 22. Various devices for optically reading a document image are housed in the upper housing 22. A known electrophotographic image forming unit 212 is arranged in the lower housing 21. Further, the lower housing 21 includes sheet cassettes 211. Sheets are stored in the sheet cassettes 211. After the sheets in the sheet cassette 211 are conveyed one by one along an unillustrated sheet conveyance path in the lower housing 21, images are formed on the sheets in the above image forming unit. The coupling housing 23 is arranged on the side of a right side surface of the apparatus body 2. The in-body space enclosed by the lower housing 21, the upper housing 22 and the coupling housing 23 serves as an in-body sheet discharge unit 24 capable of storing the sheets after image formation.

The automatic document feeder 3 is rotatably mounted on a rear side of the upper surface of the apparatus body 2. The automatic document feeder 3 automatically feeds a document sheet to be copied toward a first document reading position (document reading position X, FIG. 2) in the apparatus body 2. On the other hand, when a user manually places a document at a second document reading position adjacent to the first document reading position, the automatic document feeder 3 is opened upwardly. The automatic document feeder 3 includes a document feed tray 31, a document conveyor 32 and a document discharge tray 33. The document feed tray 31 is a tray on which a document sheet to be fed to the document reading position is to be placed. The document conveyor 32 includes a conveyance path and a conveying mechanism for conveying a document sheet on the document feed tray 31 to the document discharge tray 33 by way of the document reading position X. The document discharge tray 33 is a tray to which the document sheet having a document image optically read is to be discharged. The upper surface of a low horizontal part on the right side of a body housing serves as the document discharge tray 33.

Figure 2:
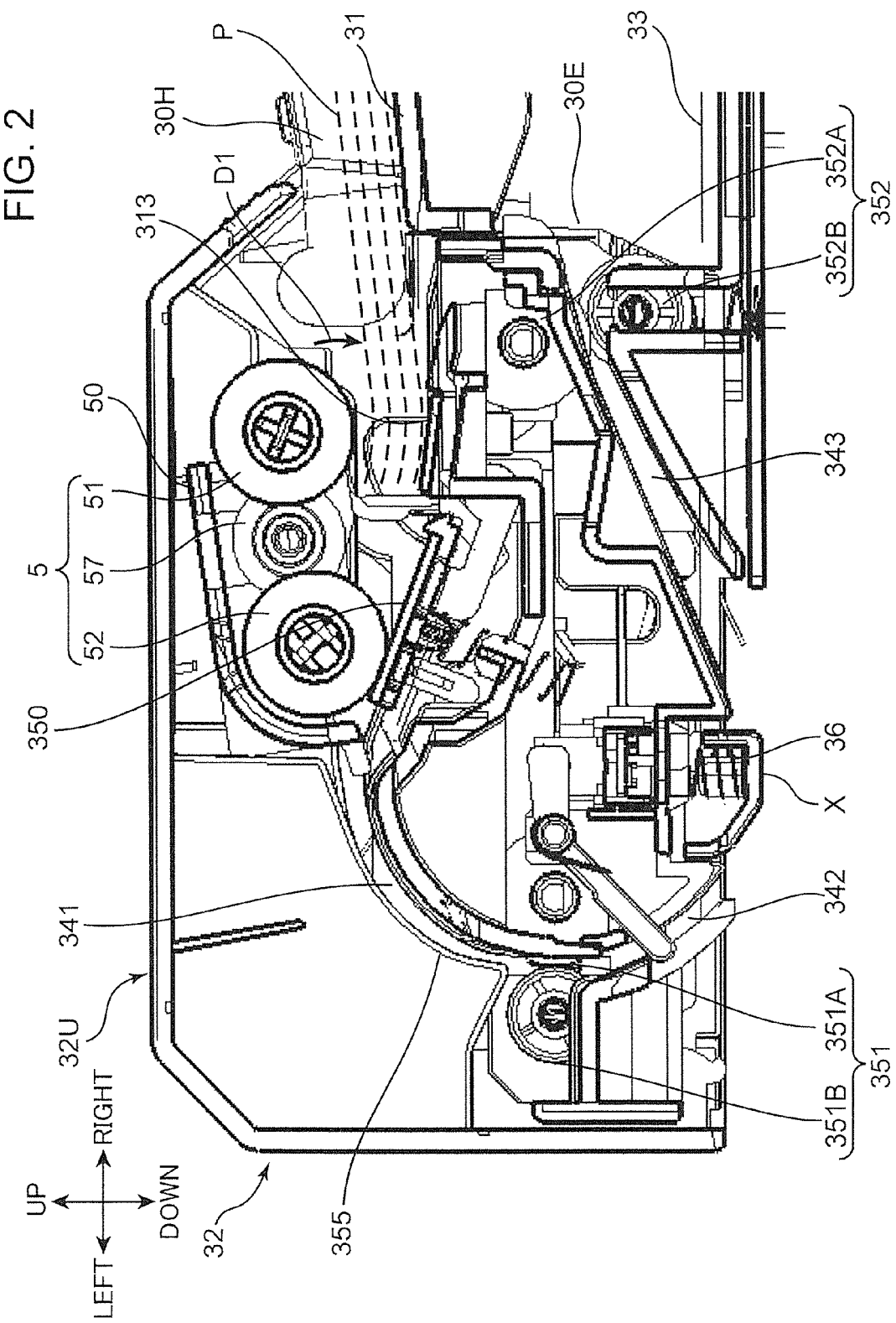
FIG. 2 is a sectional view of a conveyor of an automatic document feeder according to the one embodiment of the present disclosure.

FIG. 2 is a sectional view of the document conveyor 32, which is an essential part of the automatic document feeder 3. The document conveyor 32 includes first to third conveyance paths 341 to 343 constituting the conveyance path for a document sheet P, a first conveyor roller pair 351 and a second conveyor roller pair 352 disposed at suitable positions of these first to third conveyance paths 341 to 343, and a document feeding unit 5 (sheet feeding unit) for feeding a document sheet (sheet) placed on the document feed tray 31 into the document conveyor 32.

The first, second and third conveyance paths 341, 342 and 343 constitute the U-shaped sheet conveyance path extending from a feed port 30H (FIG. 2) to a discharge port 30E for discharging the document sheet P to the document discharge tray 33 by way of the document reading position X where a document image is optically read.

The first conveyance path 341 is a conveyance path connected to the document feed tray 31 and extending leftward and inclined slightly downwardly to the first conveyor roller pair 351 while having a substantially arcuate shape. An upper conveying surface of this first conveyance path 341 is defined by a guide member 355 (FIG. 2) of a housing 32U of the document conveyor 32.

The second conveyance path 342 is an arcuate conveyance path extending from a downstream end of the first conveyance path 341 to a position facing a surface-contact guide 36 forming the document reading position X. The third conveyance path 343 is a conveyance path extending rightward and inclined slightly upwardly from a position facing the surface-contact guide 36 to the discharge port 30E.

The first and second conveyor roller pairs 351, 352 are respectively constituted by combinations of drive rollers 351A, 352A for generating a rotational drive force for conveying the document sheet and driven rollers 351B, 352B configured to rotate following the rotation of the drive rollers 351A, 352A while being held in contact with the drive rollers 351A, 352A.

The first conveyor roller pair 351 is disposed between the first and second conveyance paths 341 and 342 and feeds the document sheet fed from the document feeding unit 5 toward the document reading position X. The second conveyor roller pair 352 is disposed at an end of the third conveyance path 343 and feeds the document sheet P finished with a reading operation at the document reading position X from the discharge port 30E toward the document discharge tray 33.

Figure 3:
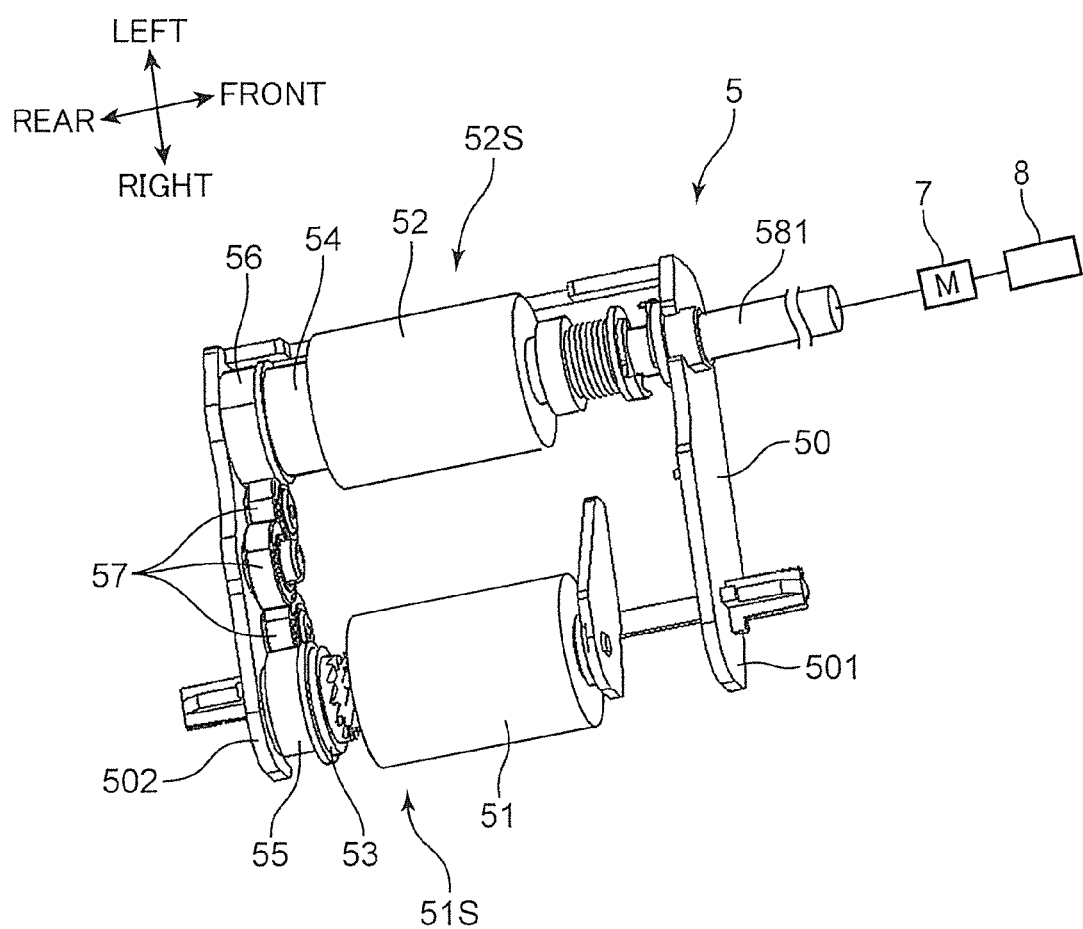
FIG. 3 is a perspective view of a document conveying unit of the conveyor of the automatic document feeder according to the one embodiment of the present disclosure.

FIG. 3 is a perspective view of the document feeding unit 5 of the document conveyor 32 when viewed from below. With reference to FIGS. 2 and 3, the document feeding unit 5 is arranged at an entrance side of the first conveyance path 31 (FIG. 2).

The document feeding unit 5 includes a holder 50 for supporting each constituent component, a pickup roller unit 51S (roller drive transmission device), a sheet feed roller unit 52S, an idler gear 57 and a drive shaft 581.

The holder 50 is swingably supported on the housing 32U of the document conveyor 32. The holder 50 swings about the drive shaft 581. By a swinging movement of the holder 50, a pickup roller 51 comes into contact with a document sheet placed on the document feed tray 31. The holder 50 includes a pair of side plates 501 and 502.

The pickup roller unit 51S is arranged on an upstream side of the holder 50 in a feeding direction of the document sheet. The pickup roller unit 51S is rotatably supported on the holder 50. The pickup roller unit 51S functions as a roller drive transmission device of the present disclosure for rotationally driving the pickup roller 51.

Similarly, the sheet feed roller unit 52S is arranged on a downstream side of the holder 50 in the feeding direction of the document sheet. The sheet feed roller unit 52S is also rotatably supported on the holder 50. The idler gear 57 is a gear train interposed between the pickup roller unit 51S and the sheet feed roller unit 52S and rotatably supported on the holder 50. The idler gear 57 transmits a rotational drive force from an input gear 56 of the sheet feed roller unit 52S to an input gear 55 of the pickup roller unit 51S.

The drive shaft 581 is a shaft rotatably supported on the housing 32U. The drive shaft 581 is arranged on the same axis as a rotation axis center of the sheet feed roller unit 52S. In this embodiment, the drive shaft 581 integrally rotates with the input gear 56 of the sheet feed roller unit 52S.

Further, the automatic document feeder 3 includes a motor 7 (driver) and a controller 8 (FIG. 3). The motor 7 generates a rotational drive force for rotating the pickup roller unit 51S and the sheet feed roller unit 52S. The motor 7 is coupled to the drive shaft 581 by an unillustrated gear mechanism. The controller 8 on-off controls the rotational drive of the motor 7.

Figure 4A:
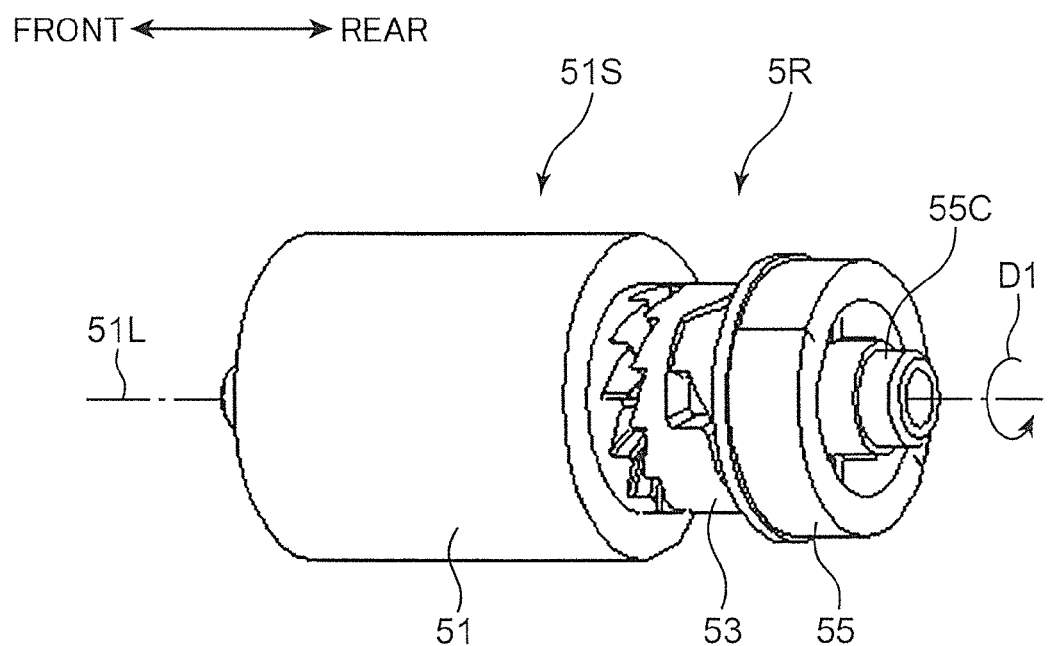
FIG. 4A is a perspective view of a pickup roller unit according to the one embodiment of the present disclosure.
Figure 6A:
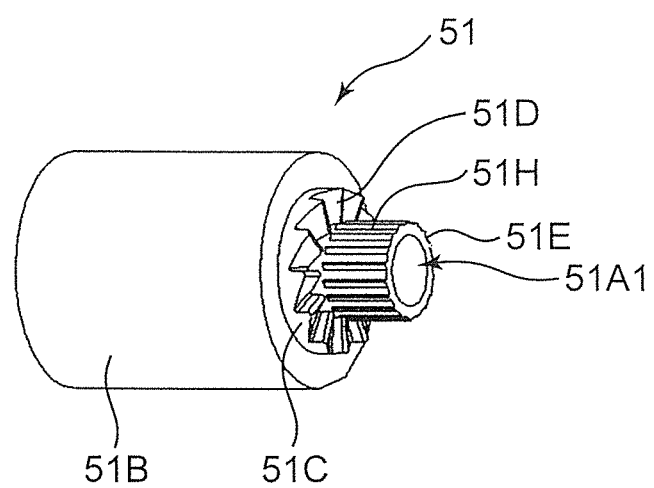
FIG. 6A is a perspective view of a roller unit according to the one embodiment of the present disclosure.
Figure 6B:
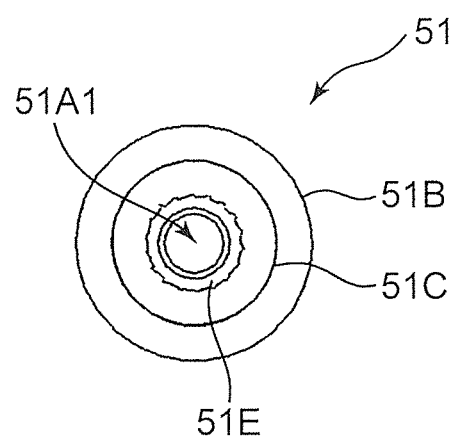
FIG. 6B is a side view of the roller unit according to the one embodiment of the present disclosure.
Figure 6C:
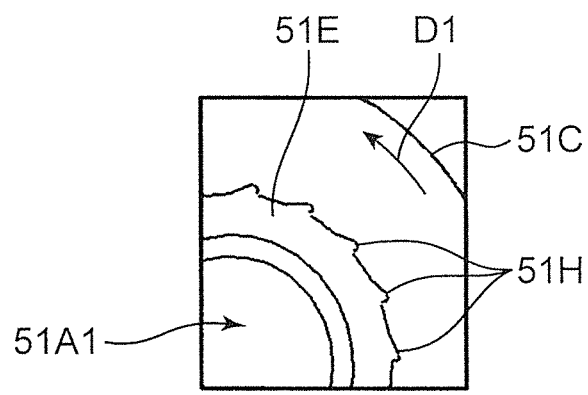
FIG. 6C is an enlarged view enlargedly showing a part of the roller unit of FIG. 6B.
Figure 7A:
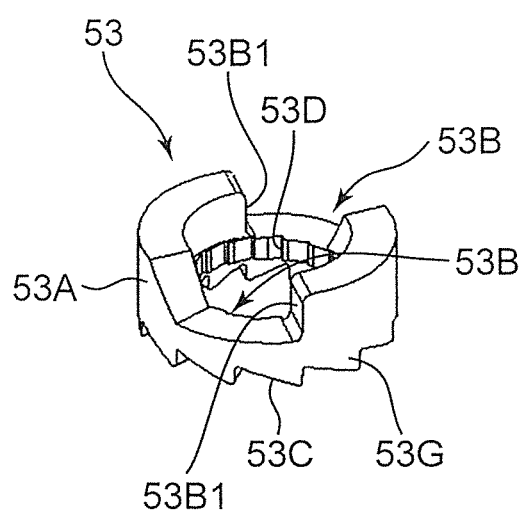
FIG. 7A is a perspective view of a drive transmission gear according to the one embodiment of the present disclosure.
Figure 7B:
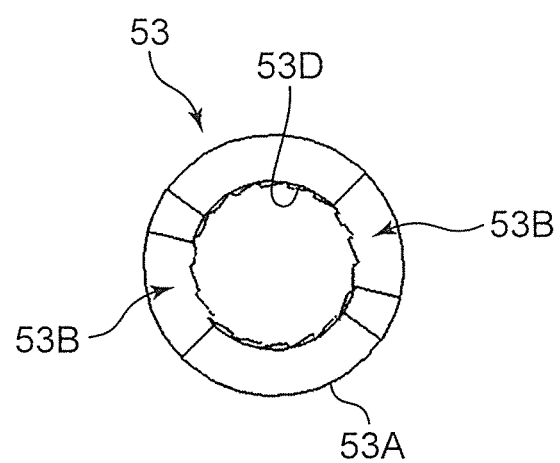
FIG. 7B is a side view of the drive transmission gear according to the one embodiment of the present disclosure.
Figure 7C:
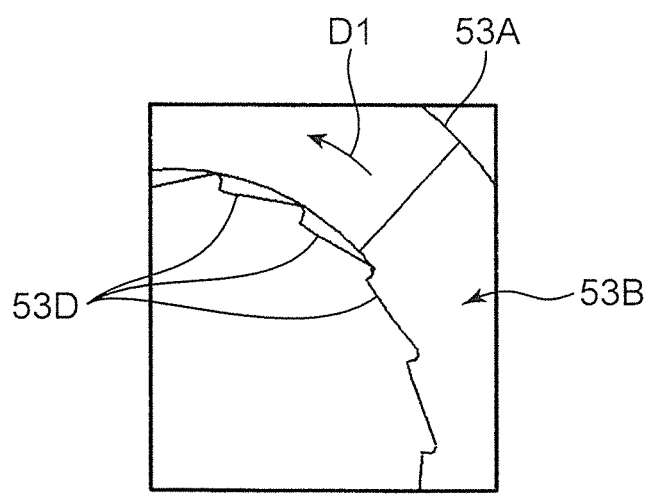
FIG. 7C is an enlarged view enlargedly showing a part of the drive transmission gear of FIG. 7B.
Figure 8:
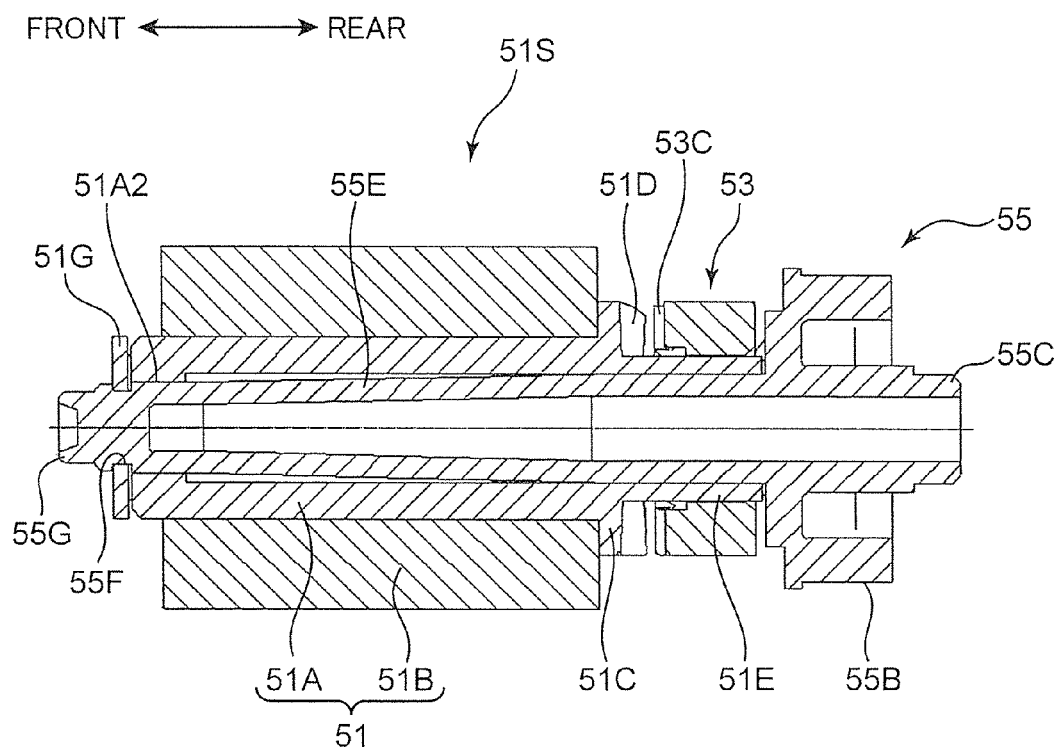
FIG. 8 is a sectional view along an axial direction of the pickup roller unit according to the one embodiment of the present disclosure.

Next, with reference to FIGS. 4A to 8, the structure of the pickup roller unit 51S according to this embodiment is described. Note that the sheet feed roller unit 52S is also structured similarly to the pickup roller unit 51S. FIGS. 4A and 4B are perspective views of the pickup roller unit 51S according to this embodiment. FIGS. 5A and 5B are perspective views of the input gear 55 (drive input gear) according to this embodiment. FIG. 6A is a perspective view of the pickup roller 51 (roller unit) according to this embodiment. FIG. 6B is a side view of the pickup roller 51 and FIG. 6C is an enlarged view enlargedly showing a part of FIG. 6B. FIG. 7A is a perspective view of a transmission gear 53 (drive transmission gear) according to this embodiment. FIG. 7B is a side view of the transmission gear 53 and FIG. 7C is an enlarged view enlargedly showing a part of FIG. 7B. FIG. 8 is a sectional view along an axial direction of the pickup roller unit 51S.

Figure 4B:
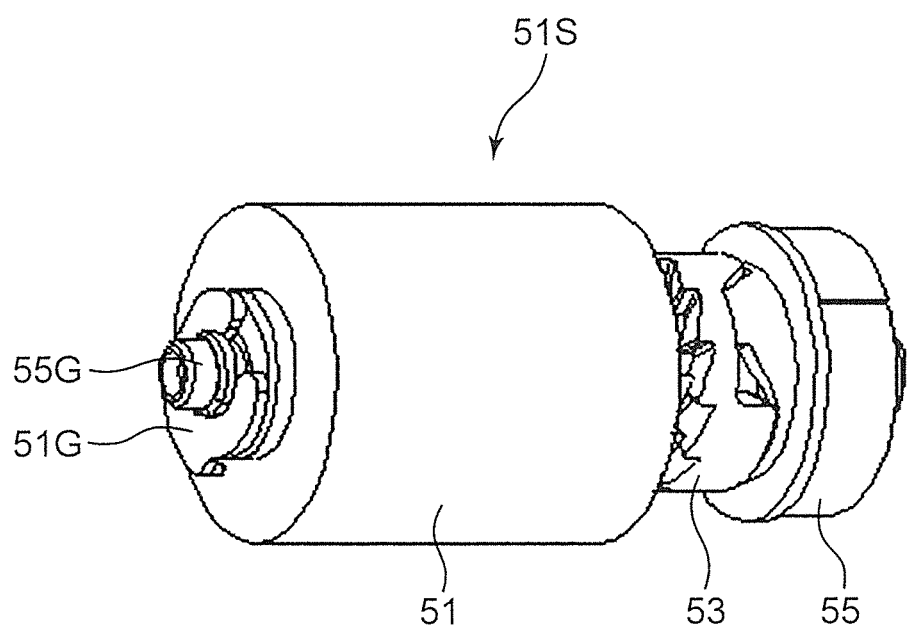
FIG. 4B is a perspective view of the pickup roller unit according to the one embodiment of the present disclosure.

The pickup roller unit 51S includes the input gear 55, the transmission gear 53, the pickup roller 51 and a clip 51G (FIG. 4B). The input gear 55, the transmission gear 53 and the pickup roller 51 constitute a ratchet mechanism 5R of the present disclosure. This ratchet mechanism 5R restricts a rotational direction of the pickup roller 51 to a predetermined sheet feeding direction. Further, the ratchet mechanism 5R switchingly transmits and cuts off the rotational drive force to the pickup roller 51 according to whether the rotational drive force is input to the input gear 55 or the input is cut off.

With reference to FIGS. 4A to 5B, the input gear 55 is a gear to be rotated in a first rotational direction (arrow D1 of FIG. 4A) about an axis 51L extending in a front-rear direction. A rotational drive force input to the input gear 56 on the side of a sheet feed roller 52 from the drive shaft 581 is transmitted to the input gear 55 via the idler gear 57. The input gear 55 is made of a resin material. With reference to FIG. 5A, the input gear 55 includes a flange portion 55A, a gear body portion 55B (gear portion), a base end shaft portion 55C, projecting portions 55D (engaging portion), a shaft portion 55E (rotary shaft portion), a groove portion 55F and a tip shaft portion 55G.

Figure 5A:
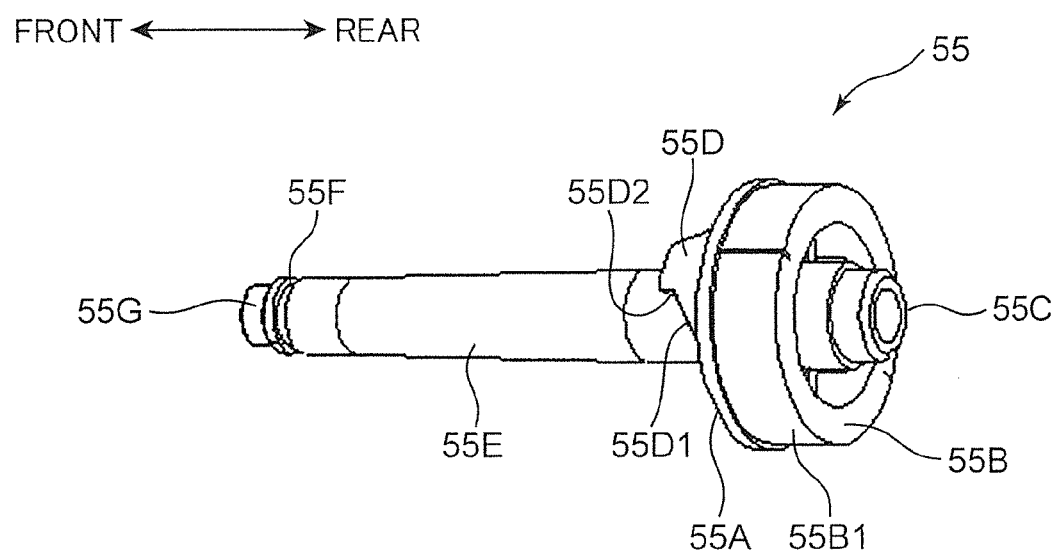
FIG. 5A is a perspective view of a drive input gear according to the one embodiment of the present disclosure.
Figure 5B:
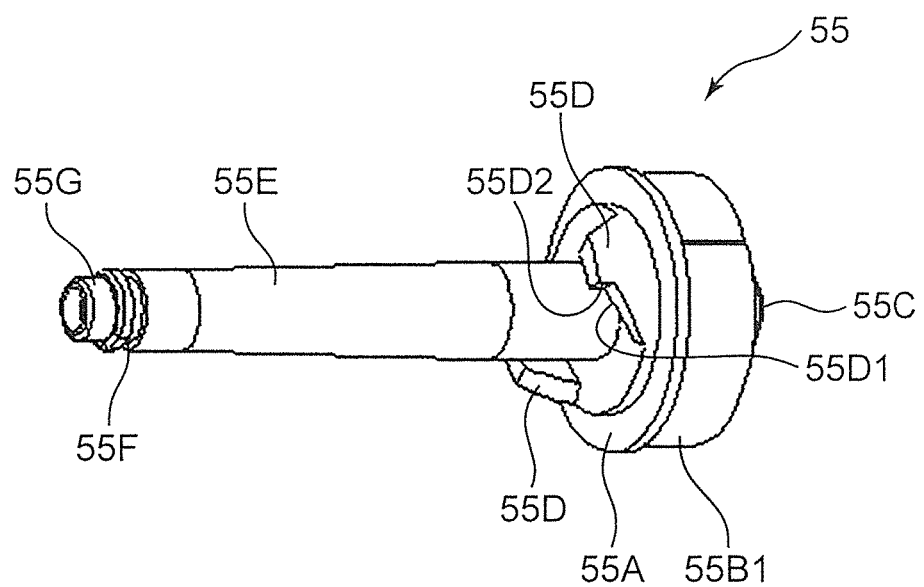
FIG. 5B is a perspective view of the drive input gear according to the one embodiment of the present disclosure.

The flange portion 55A is arranged to face in the front-rear direction and has a disc shape. The gear body portion 55B is arranged to extend rearward from the flange portion 55A. The gear body portion 55B has a hollow cylindrical shape and includes gear teeth 55B1 on an outer peripheral part thereof. Note that the detail of the gear teeth 55B1 of the gear body portion 55B are not shown in FIGS. 4A to 5B. The base end shaft portion 55C is a shaft portion projecting rearward (in an axial direction of the input gear 55) from the flange portion 55A to penetrate through the hollow cylindrical interior of the gear body portion 55B. The base end shaft portion 55C forms the axis 51L. The projecting portions 55D project forward from the flange portion 55A (side surface of the gear body portion 55B) while being spaced apart in a circumferential direction. As shown in FIG. 5B, two projecting portions 55 are arranged while being spaced part in the circumferential direction of the input gear 55, in other words, to face each other in a radial direction. Each projecting portion 55D includes an inclined portion 55D1 and a pressing portion 55D2. The inclined portion 55D1 is an inclined portion arranged downstream of the pressing portion 55D2 in the rotational direction (arrow D1 of FIG. 4A). The inclined portion 55D1 is inclined from the side of the pickup roller 51 of FIG. 4A toward the input gear 55 along the rotational direction of the input gear 55. The pressing portion 55D2 is coupled to a base end part (upstream end part in the rotational direction) of the inclined portion 55D1. The pressing portion 55D2 is an end edge extending in the front-rear direction.

The shaft portion 55E is a shaft extending forward from the flange portion 55A (side surface of the gear body portion 55B). As shown in FIGS. 5A and 5B, the shaft portion 55E has a shape somewhat tapered toward a front side. Further, the shaft portion 55E has a hollow cylindrical shape. As described later, the shaft portion 55E is arranged to penetrate through the interiors of the transmission gear 53 and the pickup roller 51. The groove portion 55F is a groove formed along the circumferential direction on a tip side of the shaft portion 55E. The tip shaft portion 55G is a tip part of the shaft portion 55E arranged forward of the groove portion 55F. The tip shaft portion 55G forms the axis 51L together with the aforementioned base end shaft portion 55C.

The transmission gear 53 is a gear arranged adjacent to the input gear 55 on the same axis 51L as the input gear 55. The transmission gear 53 is slidable along an axial direction of the axis. The transmission gear 53 is made of a resin material. With reference to FIGS. 7A and 7B, the transmission gear 53 includes a transmission gear base portion 53A, recessed portions 53B (engaged portions) and a first gear portion 53G. The transmission gear base portion 53A is a base portion of the transmission gear 53 having a hollow cylindrical shape. The recessed portions 53B are formed by cutting off parts of a side surface of a rear side of the transmission gear base portion 53A. Two recessed portions 53B are arranged while being spaced apart in a circumferential direction of the transmission gear 53, in other words, to face each other in a radial direction. The projecting portions 55D (FIG. 5B) of the input gear 55 are arranged to face the respective recessed portions 53B. Further, during the rotation of the pickup roller unit 51S, the projecting portions 55D are engaged with the recessed portions 53B. The recessed portion 53B includes a pressed portion 53B1. The pressed portion 53B1 is a side edge defining the recessed portion 53B on a downstream side in the rotational direction (arrow D1 of FIG. 4A) of the transmission gear 53. The pressed portion 53B1 is arranged to extend in the front-rear direction. The first gear portion 53G is arranged on a side surface opposite to the recessed portions 53B in an axial direction (front-rear direction) of the transmission gear 53. The first gear portion 53G includes first gear teeth 53C. The first gear teeth 53C are gear teeth arranged at intervals in the circumferential direction on the front side surface of the transmission gear base portion 53A. As shown in FIG. 7A, the first gear teeth 53C have a sawtooth shape. Specifically, each of the first gear teeth 53C is composed of an inclined surface inclined upwardly along the first rotational direction D1 of FIG. 4 and a vertical surface connected to a downstream end part of this inclined surface in the rotational direction.

The pickup roller 51 is arranged adjacent to the transmission gear 53 on the same axis 51L as the input gear 55. Note that the transmission gear 53 is arranged movably between the pickup roller 51 and the input gear 55 on the axis 51L. The pickup roller 51 feeds (conveys) a document sheet toward the document reading position X (FIG. 2) by being rotated about the axis. With reference to FIGS. 6A, 6B and 8, the pickup roller 51 includes a roller base portion 51A and an elastic roller portion 51B. The roller base portion 51A is a base portion of the pickup roller 51 and made of a resin material. The roller base portion 51A has a hollow cylindrical shape extending in the front-rear direction. The roller base portion 51A supports the elastic roller portion 51B. A first opening 51A1 and a second opening 51A2 (FIG. 8) through which the shaft portion 55E of the input gear 55 is inserted are open on rear end front end parts of the roller base portion 51A. The roller base portion 51A includes a flange portion 51C (second gear portion), second gear teeth 51D and a hollow cylindrical portion 51E (FIGS. 6A and 8).

The flange portion 51C radially projects from one side surface of the roller base portion 51A and has a disc shape. The flange portion 51C is in contact with a rear end part of the elastic roller portion 51B (FIG. 8). The flange portion 51C includes second gear teeth 51D. The second gear teeth 51D are gear teeth arranged on the rear side surface of the flange portion 51C facing the transmission gear 53 and arranged at intervals in the circumferential direction. Specifically, each of the second gear teeth 51D is composed of an inclined surface inclined downwardly along the first rotational direction D1 of FIG. 4A and a vertical surface connected to a downstream end part of this inclined surface in the rotational direction. As shown in FIG. 6A, the second gear teeth 51D have a sawtooth shape. The second gear teeth 51D are engageable with the first gear teeth 53C of the transmission gear 53. The hollow cylindrical portion 51E is a tip part of the roller base portion 51A extending rearward than the second gear teeth 51D. The elastic roller portion 51B is a hollow cylindrical member made of a rubber material and fixed to an outer peripheral part of the roller base portion 51A. The elastic roller portion 51B integrally rotates with the roller base portion 51A, whereby a document sheet on the document feed tray 31 is fed (conveyed).

The clip 51G (FIGS. 4B and 8) prevents the detachment of the transmission gear 53 and the input gear 55 from the pickup roller 51. The clip 51G is fitted into the groove portion 55F (FIGS. 5A and 5B) of the input gear 55.

With reference to FIG. 8, the transmission gear 53 is fitted on the hollow cylindrical portion 51E of the roller base portion 51A from behind. At this time, the transmission gear 53 is made relatively rotatable with respect to the pickup roller 51 and, further, a predetermined clearance is formed between the outer peripheral surface of the hollow cylindrical portion 51E and the inner peripheral surface of the transmission gear 53 so that the transmission gear 53 is slidable in the front-rear direction (axial direction). Further, the shaft portion 55E of the input gear 55 is inserted into the hollow cylindrical portion 51E through the first opening 51A1 of the roller base portion 51A and projects outwardly of the roller base portion 51A through the second opening 51A2 after passing through the interior of the roller base portion 51A. When the clip 51G is fitted into the groove portion 55F, the pickup roller 51, the transmission gear 53 and the input gear 55 are integrated. As a result, the hollow cylindrical portion 51E of the roller base portion 51A supports the transmission gear 53 slidably in the axial direction. Thereafter, the pickup roller unit 51S is mounted in the holder 50 while the base end shaft portion 55C and the tip shaft portion 55G are rotatably supported on unillustrated bearings of the holder 50 (FIG. 3).

Figure 9A:
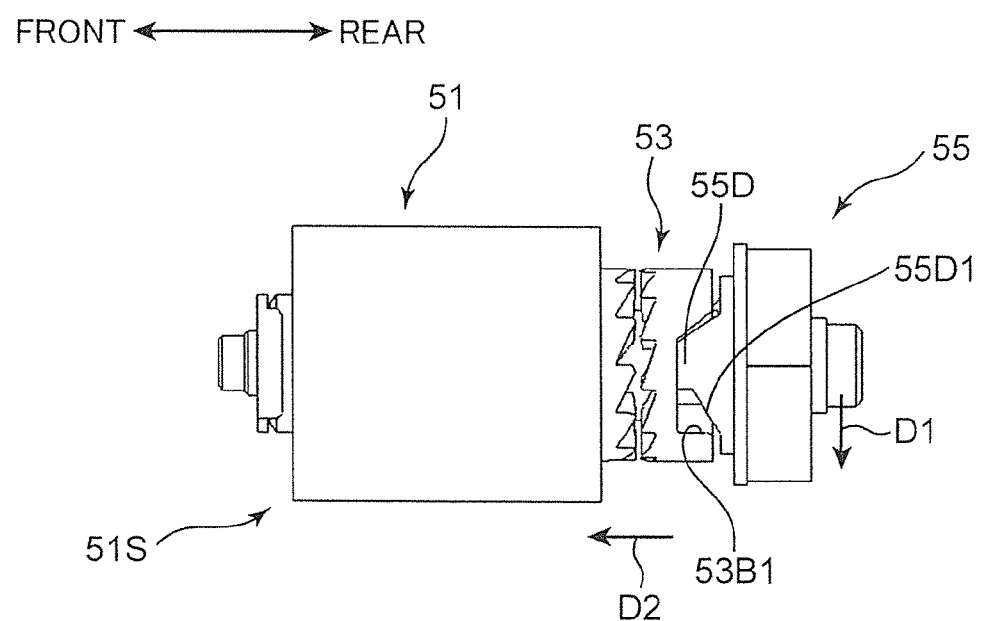
FIG. 9A is a diagram showing a state of drive transmission of the pickup roller unit according to the one embodiment of the present disclosure.
Figure 9B:
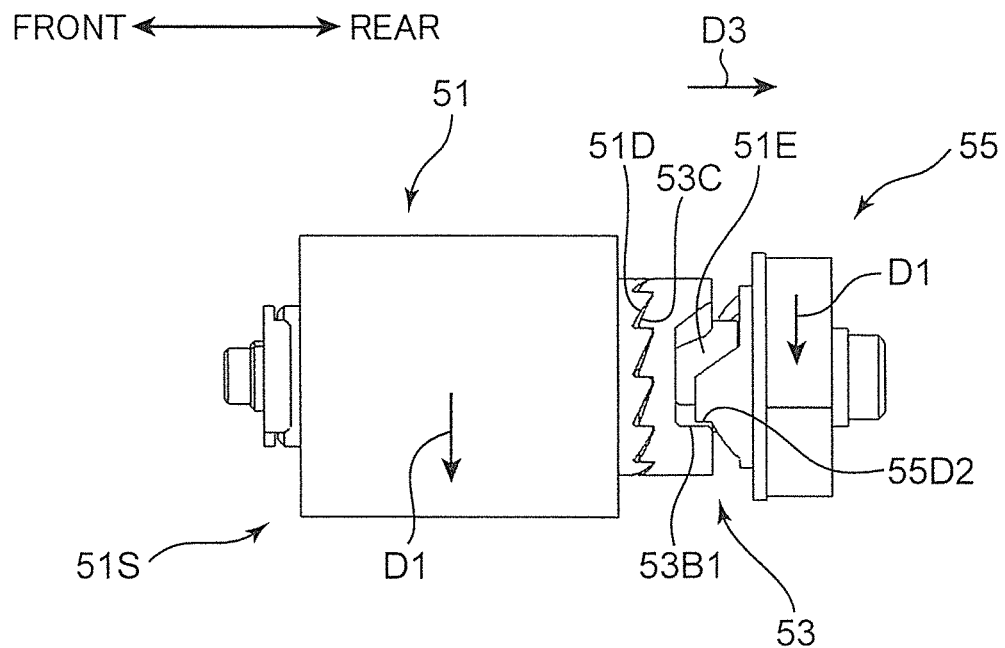
FIG. 9B is a diagram showing a state of drive transmission of the pickup roller unit according to the one embodiment of the present disclosure.

Next, the transmission of the rotational drive force of the pickup roller unit 51S is described with reference to FIGS. 9A and 9B. FIGS. 9A and 9B are diagrams showing a state of drive transmission of the pickup roller unit 51S according to this embodiment. Note that the position of the transmission gear 53 in the axial direction in FIG. 9A corresponds to a second position of the present disclosure and the position of the transmission gear 53 in the axial direction in FIG. 9B corresponds to a first position of the present disclosure.

A rotational drive force generated by the motor 7 (FIG. 3) is input to the gear body portion 55B of the input gear 55 from the drive shaft 58I, the input gear 56 and the idler gear 57. As a result, the input gear 55 is first rotated in a predetermined rotational direction (first rotational direction) in the pickup roller unit 51S. When the input gear 55 is rotated, the projecting portions 55D of the input gear 55 are engaged with the recessed portions 53B of the transmission gear 53. Specifically, the projecting portions 55D of the input gear 55 first come into contact with rear end parts of the pressed portions 53B1 of the recessed portions 53B. At this time, forward forces are applied to the pressed portions 53B1 by the inclination of the inclined portions 55D1 (arrow D2 of FIG. 9A). More specifically, forces along the axial direction are applied by sliding movements of the rear end parts of the pressed portions 53B1 along the inclined portions 55D1 by the rotation of the input gear 55. As a result, the transmission gear 53 is slid from the second position (FIG. 9A) to the first position (FIG. 9B) on the side of the pickup roller 51. Further, the pressing portions 55D2 of the input gear 55 press the pressed portions 53B1 of the recessed portions 53B in the circumferential direction (FIG. 9B), whereby the input gear 55 and the transmission gear 53 are integrally rotated. Furthermore, the first gear teeth 53C of the transmission gear 53 slid to the first position are engaged with the second gear teeth 51D of the pickup roller 51, whereby the transmission gear 53 and the pickup roller 51 integrally rotate. As a result, the input gear 55, the transmission gear 53 and the pickup roller 51 integrally rotate in the first rotational direction (arrow D1 of FIG. 9B).

On the other hand, the controller 8 (FIG. 3) stops the rotation of the motor 7 upon finishing a feeding operation of the document sheet on the document feed tray 31 or at timings corresponding to intervals between a plurality of document sheets. As a result, the input of the rotational drive force to the input gear 55 is cut off. On the other hand, the document sheet fed by the document feeding unit 5 is conveyed by the first conveyor roller pair 351 (FIG. 2) downstream of the document feeding unit 5. Thus, the feed of the document sheet is not obstructed, wherefore the sheet feed roller 52 and the pickup roller 51 are rotated, following the document sheet.

When the pickup roller 51 is rotated in the direction D1, following the document sheet, the second gear teeth 51D rotate in the direction D1 with respect to the first gear teeth 53C. Then, the first gear teeth 53C are pressed rearwardly (direction toward the input gear 55) (axial direction) by the second gear teeth 51D, whereby the first and second gear teeth 53C and 51D are disengaged and the transmission gear 53 is slid from the first position (FIG. 9B) to the second position (FIG. 9A). As a result, the pickup roller 51 and the transmission gear 53 are disengaged and only the pickup roller 51 is stably rotated, following the document sheet.

As just described, in this embodiment, the transmission of the rotational drive force to the pickup roller 51 is switched by a sliding movement of the transmission gear 53. Specifically, the pickup roller unit 51S has a ratchet mechanism 5R for coupling and decoupling the input gear 55, the transmission gear 53 and the pickup roller 51.

In the configuration as described above, the hollow cylindrical transmission gear 53 is fitted on the hollow cylindrical portion 51E of the pickup roller 51 and rotatably supported. A sliding movement of the transmission gear 53 may not be smoothly realized when the pickup roller unit 51S is obliquely mounted with respect to the axis 51L and when an external matter enters between the transmission gear 53 and the hollow cylindrical portion 51E. In this case, a ratchet function of coupling and decoupling the gears as described above is reduced and a rotation failure of the pickup roller 51 and a feed failure of the document sheet occur. Particularly when a movement load of the transmission gear 53 in the axial direction is larger than a rotational load of the transmission gear 53 in the first rotational direction (D1) in FIG. 9A, it is difficult for the transmission gear 53 to slide to the first position shown in FIG. 9B. In this case, clearances are formed between the pressing portions 55D2 of the input gear 55 and the pressed portions 53B1 of the transmission gear 53 and the pressed portions 53B1 cannot slide on the inclined portions 55D1. Thus, a failure occurs in the engagement between the first and second gear teeth 53C and 51D to cause a rotation failure of the pickup roller 51.

Figure 10A:
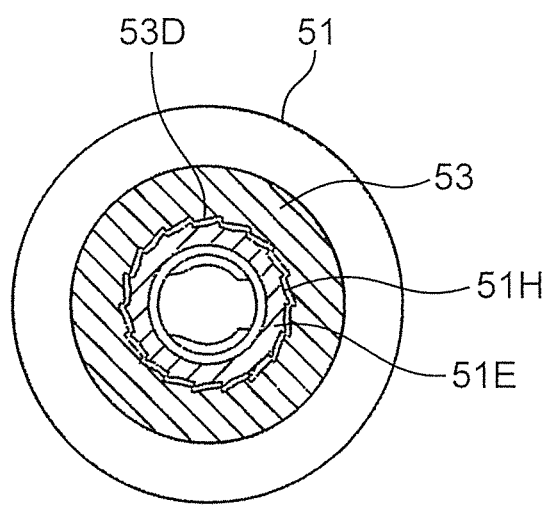
FIG. 10A is a detailed side view of the roller unit and the drive transmission gear according to the one embodiment of the present disclosure.
Figure 10B:
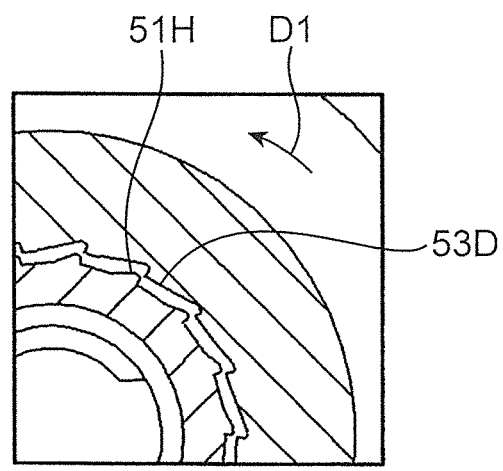
FIG. 10B is an enlarged view enlargedly showing parts of the roller unit and the drive transmission gear of FIG. 10A.

In this embodiment, the pickup roller unit 51S includes a load adjustment mechanism to solve such a problem. The load adjustment mechanism has a function of making a rotational load in the first rotational direction of the transmission gear 53 arranged at the second position larger than a movement load of the transmission gear 53 in the axial direction. In this embodiment, the load adjustment mechanism is provided in the transmission gear 53 and the pickup roller 51. FIG. 10A is a detailed side view of the pickup roller 51 and the transmission gear 53. FIG. 10B is an enlarged view enlargedly showing parts of the pickup roller 51 and the transmission gear 53 of FIG. 10A.

With reference to FIGS. 6A, 10A and 10B, the pickup roller 51 includes outer peripheral gear teeth 51H (hollow cylindrical gear). A plurality of outer peripheral gear teeth 51H are formed at intervals in the circumferential direction on the outer peripheral surface of the hollow cylindrical portion 51E of the pickup roller 51. Further, the outer peripheral gear teeth 51H have a sawtooth shape having an inclined surface inclined downwardly along the first rotational direction (arrow D1 of FIG. 6C).

On the other hand, with reference to FIGS. 7A to 7C, 10A and 10B, the transmission gear 53 includes inner peripheral gear teeth 53D (inner peripheral surface gear). A plurality of inner peripheral gear teeth 53D are formed at intervals in the circumferential direction on the inner peripheral surface of the transmission gear 53. Further, the inner peripheral gear teeth 53D have a sawtooth shape having an inclined surface inclined downwardly along the first rotational direction (arrow D1 of FIG. 7C). Namely, the plurality of outer peripheral gear teeth 51H and the plurality of inner peripheral gear teeth 53D are inclined parallel along the first rotational direction.

With reference to FIGS. 9A, 10A and 10B, when the inclined portions 55D1 of the input gear 55 press the pressed portions 53B1 of the transmission gear 53, the inner peripheral gear teeth 53D are rotated in the direction D1 of FIG. 10B with the outer peripheral gear teeth 51H held substantially stationary. Thus, the inner peripheral gear teeth 53D are engaged with the outer peripheral gear teeth 51H and the rotational load of the transmission gear 53 in the first rotational direction becomes larger than the movement load of the transmission gear 53 in the axial direction. Thus, the transmission gear 53 doesn't rotate relatively against the hollow cylindrical portion 51E and smoothly slides along the axial direction from the second position to the first position and the first gear teeth 53C of the transmission gear 53 slid to the first position are engaged with the second gear teeth 51D of the pickup roller 51 whereby the transmission of the rotational drive force to the pickup roller 51 is stably realized. In other words, a transmission failure of the rotational drive force to the pickup roller 51 is suppressed. As a result, the document sheet can be stably conveyed to the document reading position X (FIG. 2) (image reading position) and an image can be stably formed on the sheet in an unillustrated image forming unit according to a document image of the conveyed document.

Further, with reference to FIG. 10B, when the pickup roller 51 is rotated, following the document sheet, the outer peripheral gear teeth 51H are rotated in the direction D1 of FIG. 10B with the inner peripheral gear teeth 53D held substantially stationary. At this time, the inner peripheral gear teeth 53D rub against top parts of the outer peripheral gear teeth 51H, but the both gear teeth are not strongly engaged. Thus, an increase of the rotational load of the transmission gear 53 is suppressed. As a result, the pickup roller 51 can stably rotated, following the document sheet.

Although the sheet conveying device according to the embodiment of the present disclosure has been described above, the present disclosure is not limited to this and, for example, the following modifications can be adopted.

Figure 11A:
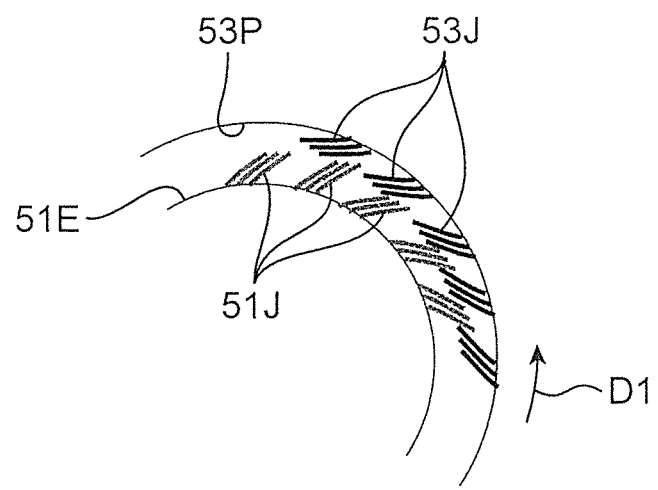
FIG. 11A is an enlarged view enlargedly showing parts of the roller unit and the drive transmission gear according to a modification of the present disclosure.

Although the load adjustment mechanism of the present disclosure has been described by the outer peripheral gear teeth 51H and the inner peripheral gear teeth 53D (FIG. 10B) in the above embodiment, the present disclosure is not limited to this. The load adjustment mechanism may be a friction generating member arranged on the inner peripheral surface of the transmission gear 53 and the outer peripheral surface of the hollow cylindrical portion 51E of the pickup roller 51 and configured to generate frictional forces of different magnitudes in a relative rotational direction between the transmission gear 53 and the pickup roller 51. FIG. 11A is a diagram enlargedly showing the outer peripheral surface of the hollow cylindrical portion 51E and an inner peripheral surface 53P of the transmission gear 53 for explaining the friction generating member as a modification of the present disclosure. In this modification, an anisotropic friction generating member is composed of first fibers 51J (fiber members) arranged on the hollow cylindrical portion 51E of the pickup roller 51 and second fibers 53J (fiber members) arranged on the inner peripheral surface 53P of the transmission gear 53. The first fibers 51J are obliquely planted to face in the first rotational direction (arrow D1). Further, the second fibers 53J are planted in advance along the first rotational direction.

According to such a configuration, since the second fibers 53J are caught by the first fibers 51J when the transmission gear 53 is rotated in the first rotational direction, the rotational load of the transmission gear 53 is increased. Thus, the rotational load of the transmission gear 53 in the first rotational direction is set larger than the movement load of the transmission gear 53 in the axial direction by the frictional forces generated by the friction generating member. Therefore, a sliding movement of the transmission gear 53 from the second position to the first position is smoothly realized. Note that since the first fibers 51J move along the surface of the second fibers 53J when the pickup roller 51 rotates, following the document sheet, the rotational load of the transmission gear 53 is unlikely to increase. As just described, in this modification, a frictional force of the transmission gear 53 can be adjusted by the contact of the first fibers 51J and the second fibers 53J.

Figure 11B:
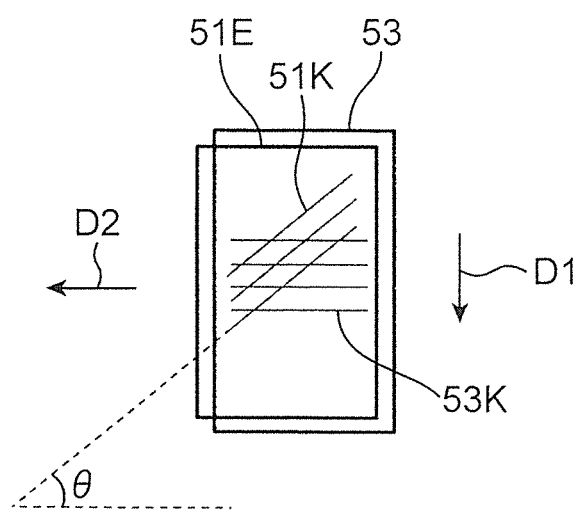
FIG. 11B is a diagram showing groove portions of the roller unit and the drive transmission gear according to a modification of the present disclosure.

Further, FIG. 11B is a schematic perspective view enlargedly showing the vicinities of the outer peripheral surface of the hollow cylindrical portion 51E and the inner peripheral surface of the transmission gear 53 for explaining a friction generating member as another modification of the present disclosure. In this modification, an anisotropic friction generating member is composed of first grooves 51K (grooves) arranged on the hollow cylindrical portion 51E of the pickup roller 51 and second grooves 53K (grooves) arranged on the inner peripheral surface of the transmission gear 53. The first grooves 51K are formed obliquely to the first rotational direction (arrow D1). Further, the second grooves 53K are formed along the axial direction. Note that these grooves are formed of known knurled grooves.

According to such a configuration, since the second grooves 53K are caught by the first grooves 51K when the transmission gear 53 is rotated in the first rotational direction, the rotational load of the transmission gear 53 is increased. Thus, the rotational load of the transmission gear 53 in the first rotational direction is set larger than the movement load of the transmission gear 53 in the axial direction by frictional forces generated by the friction generating member. Therefore, a sliding movement of the transmission gear 53 from the second position to the first position is smoothly realized. Note that, in this modification, an angle θ between the first grooves 51K and the second grooves 53K is desirably smaller than 45°. In this case, the rotational load of the transmission gear 53 is stably increased. Further, since components of force along the axial direction (arrow D2 of FIG. 11B) are generated from the frictional forces generated between the inner peripheral surface of the transmission gear 53 and the outer peripheral surface of the hollow cylindrical portion 51E by the inclination of the first grooves 51K, the sliding movement of the transmission gear 53 is more smoothly realized. As just described, in this modification, a frictional force of the transmission gear 53 can be adjusted by forming the grooves on the inner peripheral surface of the transmission gear 53 and the outer peripheral surface of the hollow cylindrical portion 51E of the pickup roller 51.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

The invention claimed is:

1. A roller drive transmission device, comprising:
   a drive input gear including a gear portion to be rotated in a first rotational direction about a predetermined axis by having a rotational drive force input thereto and an engaging portion formed on a side surface of the gear portion;
   a drive transmission gear arranged adjacent to the drive input gear on the axis and slidable along an axial direction of the axis, the drive transmission gear including an engaged portion formed on one side surface in the axial direction and to be engaged with the engaging portion and a first gear portion having first gear teeth formed on the other side surface opposite to the engaged portion;
   a roller unit arranged adjacent to the drive transmission gear on the axis and configured to convey a sheet by being rotated about the axis, the roller unit including a second gear portion having second gear teeth formed on a side surface facing the drive transmission gear and engageable with the first gear teeth; and
   a ratchet mechanism configured to couple or decouple the drive input gear and the roller unit with rotation about the axis,
   wherein:
   the ratchet mechanism is configured such that in case the rotational drive force is input to the drive input gear, the drive input gear, the drive transmission gear and the roller unit are integrally rotated in the first rotational direction by the engagement of the first and second gear teeth, the drive input gear rotates in the first rotational direction and the drive transmission gear is slid to a first position close to the roller unit, and that the first and second gear teeth are disengaged, whereby the drive transmission gear is slid to a second position closer to the drive input gear than the first position to decouple the roller unit and the drive transmission gear, in case the input of the rotational drive force to the drive input gear is cut off, the roller unit rotates, following the sheet, and the second gear teeth are rotated in the first rotational direction with respect to the first gear teeth; and
   the ratchet mechanism includes a load adjustment mechanism configured to make a rotational load in the first rotational direction of the drive transmission gear arranged at the second position larger than a movement load in the axial direction.

2. A roller drive transmission device according to claim 1, wherein:
   the drive input gear further includes a rotary shaft portion extending in the axial direction from the gear portion and forming the axis;
   the drive transmission gear has a cylindrical shape with an inner peripheral surface;
   the roller unit includes a cylindrical portion projecting from a side surface facing the drive transmission gear, having the rotary shaft portion inserted therethrough, having the drive transmission gear externally fitted thereon and configured to support the drive transmission gear slidably in the axial direction; and
   the load adjustment mechanism includes:
      an inner peripheral surface gear having a plurality of gear teeth arranged along a circumferential direction on the inner peripheral surface of the drive transmission gear; and
      a cylindrical gear having a plurality of gear teeth arranged along a circumferential direction on an outer peripheral surface of the cylindrical portion of the roller unit and configured to be engaged with the inner peripheral surface gear.

3. A roller drive transmission device according to claim 2, wherein:
   the inner peripheral surface gear has a sawtooth shape with inclined surfaces inclined upwardly along the first rotational direction; and
   the cylindrical gear has a sawtooth shape with inclined surfaces inclined downwardly along the first rotational direction.

4. A roller drive transmission device according to claim 1, wherein:
  the drive transmission gear has a cylindrical shape with an inner peripheral surface;
  the roller unit includes a cylindrical portion projecting from a side surface facing the drive transmission gear and to be inserted into an interior of the drive transmission gear; and
  the load adjustment mechanism includes an anisotropic friction generating member arranged on the inner peripheral surface of the drive transmission gear and an outer peripheral surface of the cylindrical portion of the roller unit and configured to generate frictional forces of different magnitudes in response to a direction of a relative rotation between the drive transmission gear and the roller unit.

5. A roller drive transmission device according to claim 4, wherein:
  the anisotropic friction generating member is composed of fiber members arranged on the inner peripheral surface of the drive transmission gear and the outer peripheral surface of the cylindrical portion of the roller unit.

6. A roller drive transmission device according to claim 4, wherein:
  the anisotropic friction generating member includes a plurality of grooves formed on the inner peripheral surface of the drive transmission gear and the outer peripheral surface of the cylindrical portion of the roller unit.

7. An automatic document feeder, comprising:
  the roller drive transmission device according to claim 1; and
  a sheet feeding unit including the roller unit, which feeds the sheet,
  wherein:
  the sheet is a document having a document image formed on a surface; and
  the sheet feeding unit conveys the document toward an image reading position where the document image is read.

8. An image forming apparatus, comprising:
  an automatic document feeder according to claim 7; and
  an image forming unit configured to form an image on a sheet based on the document image.

\* \* \* \* \*